(No Model.) 2 Sheets—Sheet 1.
O. VON NERTA.
DRY DOCK.
No. 472,566. Patented Apr. 12, 1892.
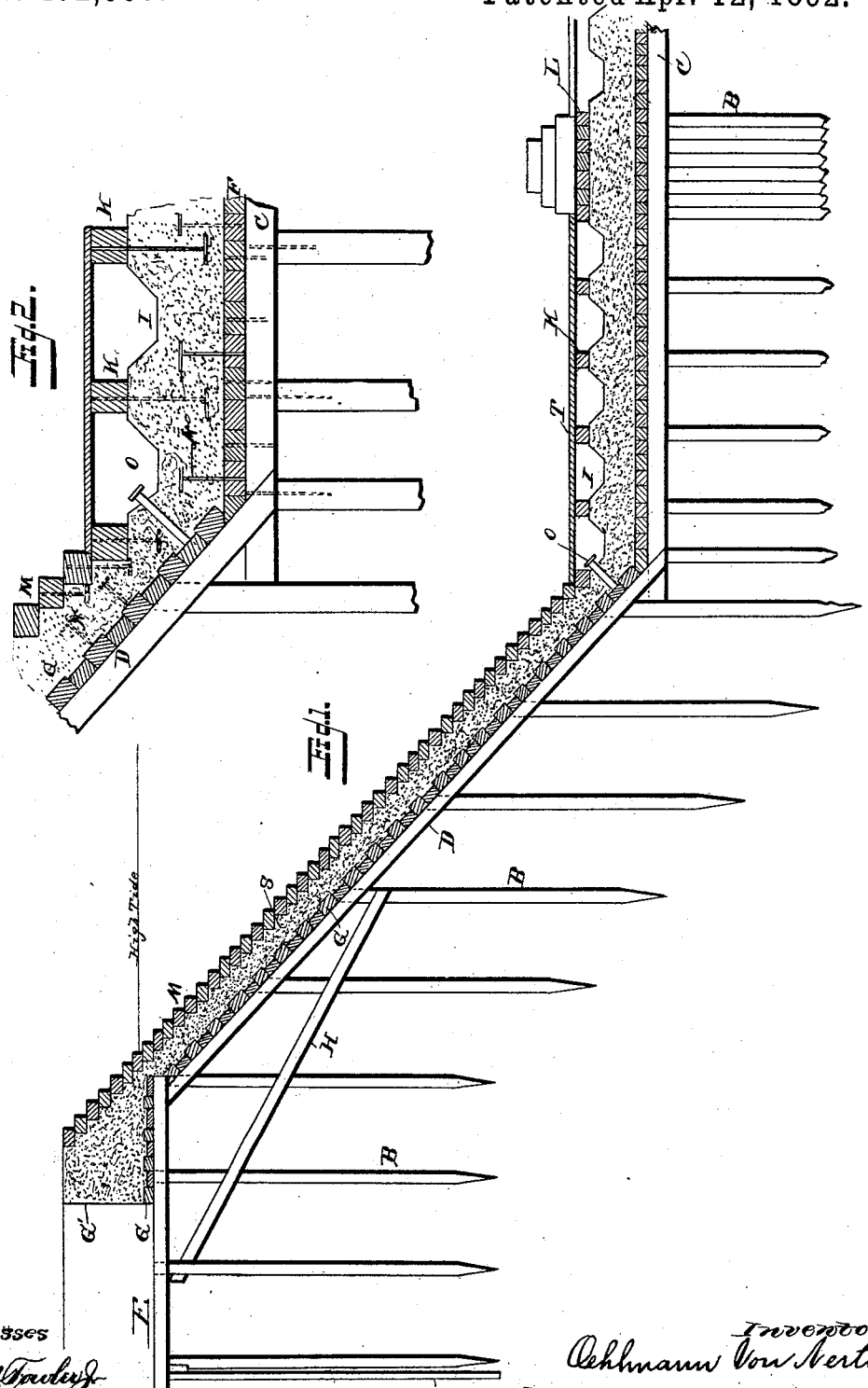

(No Model.) 2 Sheets—Sheet 2.
O. VON NERTA.
DRY DOCK.
No. 472,566. Patented Apr. 12, 1892.
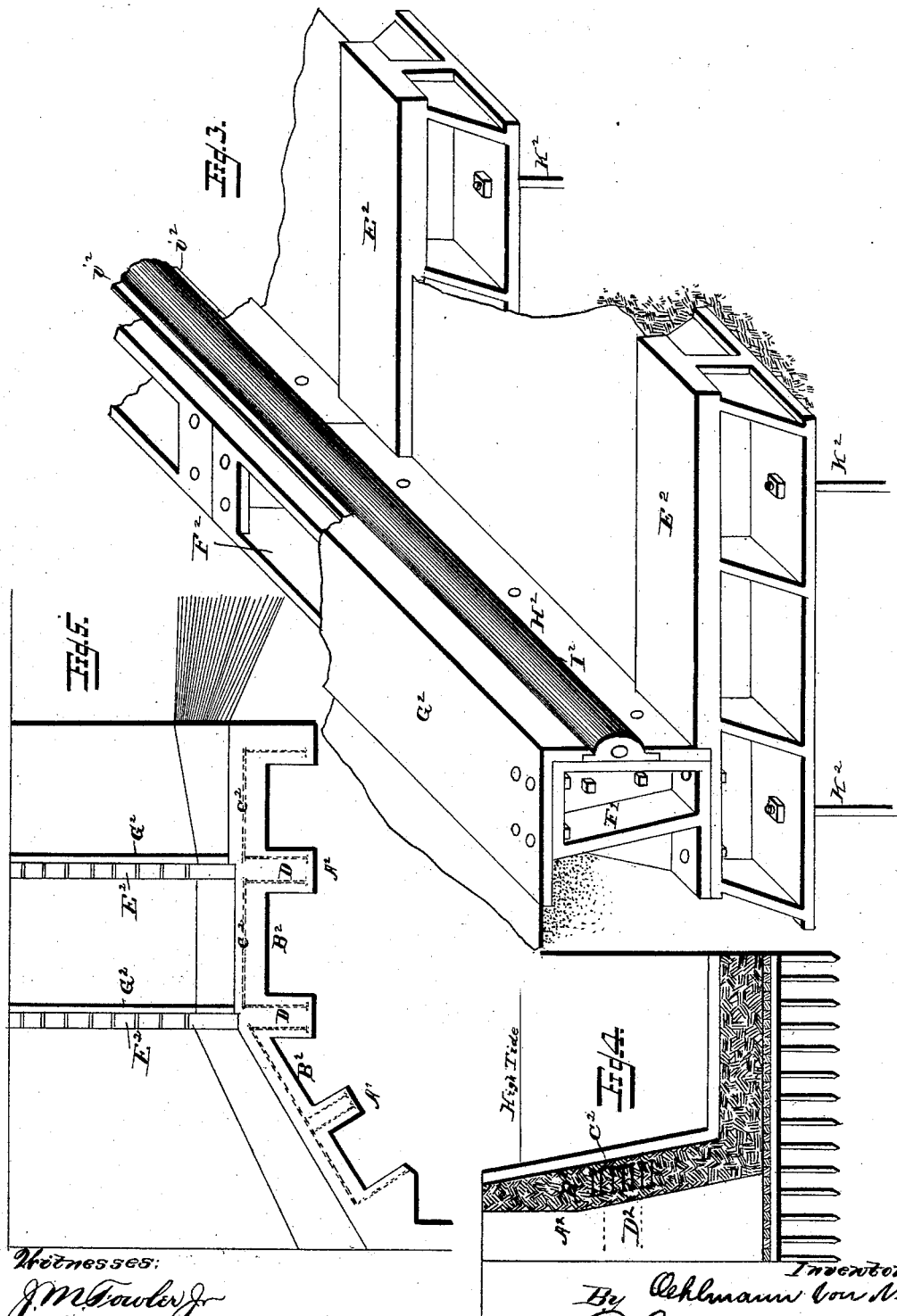

UNITED STATES PATENT OFFICE.

OEHLMANN VON NERTA, OF WASHINGTON, DISTRICT OF COLUMBIA.

DRY-DOCK.

SPECIFICATION forming part of Letters Patent No. 472,566, dated April 12, 1892.

Application filed December 17, 1891. Serial No. 415,435. (No model.)

*To all whom it may concern:*

Be it known that I, OEHLMANN VON NERTA, of Washington, District of Columbia, have invented certain new and useful Improvements in Dry-Docks; and I do hereby declare the following to be a full, clear, and exact description of the same, reference being had to the accompanying drawings, forming a part of this specification, and to the letters of reference marked thereon.

This invention relates particularly to improvements in that class of dry-docks known as "permanent" dry-docks, being built upon land in proximity to a water-way or harbor; and it has for its object the construction of a dry-dock in which the timber and wood-work are protected against the action of sea-water and marine animal and vegetable life.

The invention consists in certain novel details of construction and combinations and arrangements of parts, as will be hereinafter described, and pointed out particularly in the appended claims.

Referring to the accompanying drawings, Figure 1 is a transverse section through one side of a dry-dock constructed in accordance with my present invention. Fig. 2 is an enlarged detail of a section of the bottom and side. Fig. 3 is a detail sectional perspective of the bottom of the gateway. Fig. 4 is a section immediately in front of one of the gateways; and Fig. 5 is a top plan view of one side of the entrance to the dock, showing both gateways.

Similar letters of reference in the several figures indicate the same parts.

The timber dry-docks as now constructed, it is well known, are subject to early decay and destruction, the piles and other timber-work being so situated as to be alternately dry and wet, and the abutments and table end, furthermore, are subject to the attacks of marine animal and vegetable life in spite of the creosoting and sheathing adopted to prevent the same. To overcome these defects, I have in the present instance adopted the idea of locating the timber-work, except the superficial flooring and altars, permanently below high-tide level, where the water is invited to reach the timber by saturation through the soil, instead of making efforts to keep the water away from the timbers, as has been the usual custom. Thus the advantage of having the timbers always covered by water, where they are practically indestructible, is secured, while the earth and dock-walls afford protection against marine life.

In carrying the invention into practice it is preferable to employ the usual sheet-piling—such as A—around the dock site during the process of construction, which sheet-piling is, however, wholly or partially removed after the dock is finished. Within the space so inclosed the excavation for the dock is made, and if the foundation be soft and marshy, as is usual in the localities where docks are built, piles B are driven approximately conforming to the contour of the dock, with their upper ends below high-tide level, and the piles are then firmly united and braced by timber-work E on the coping, diagonal timber-work D on the sides, and horizontal timber-work C at the bottom, with diagonal braces H for the altar-piles, if necessary. The timber-work thus described preferably runs transversely, as shown, the number of piles and strength of timber-work being governed by the loads to be supported, and upon said timber-work are firmly secured timbers or planks G, which at the bottom may be of the same thickness; but on the inclined side beneath the altar-piles they are alternately thick and thin, forming a series of ridges or depressions running horizontally around the dock, as shown clearly in Fig. 1. The ridges or depressions, it is obvious, may be formed otherwise than by thick and thin timbers; but this method is preferred, inasmuch as it forms an almost ideal support for the concrete filling S, which is laid evenly over the entire surface of the timbers G to form a water-tight flooring, which by reason of the underlying timber-work is eminently well fitted to resist the hydrostatic pressure from the outside. At the bottom of the dock the concrete is preferably somewhat thicker than at other points and has formed in it a series of gutters I, communicating with a pump-well, from which water may be taken by any ordinary appliance. A plank flooring T, supported on longitudinal timbers K at the bottom, is provided, and at the center or in position to lie beneath the keel of vessels in the dock a number of timbers L are placed close together, with the usual keel-blocks to distribute the pressure at this point evenly over as large surface as may be required.

The altars are formed of a series of rectangular timbers M, each arranged horizontally and independently supported and partially embedded in the surface of the concrete filling. Thus the shrinkage, which is bound to occur, is local, and does not open cracks or strain the concrete filling, so as to crack the same. The edge of each altar preferably overlaps the next lower altar, as shown. Above high-water line a heavy coping G', preferably of concrete, is provided, upon which heavy machinery, cranes, &c., may be placed.

In order to consolidate the construction and overcome the lifting tendency of the water when the dock is full, headed anchor-bolts N are driven into the timbers F in the bottom of the dock before the concrete is spread, and the timbers above the concrete are held in place by anchor-bolts extending into the concrete, as shown. The altars are fastened in the same manner; but it is obvious that the altars may be spiked or fastened to carriage blocks or beams, either embedded or bolted to the concrete. Should it be found necessary, tubes O, with hand or automatic pressure-valves, may be passed through the concrete at the bottom to relieve external hydrostatic pressure, as will be readily understood.

Referring to Sheet 2 of the drawings, illustrating the table end of the dock, it will be seen that the whole table end is constructed of concrete and metal, except the foundations, which consist of timber-work of usual construction supported by piles when required.

$A^2$ are strong concrete piers in size proportioned to resist the pressure of the water. The connecting-walls $B^2$ are comparatively thin, and in order to give them sufficient strength to resist the pressure of the water iron beams $C^2$ are embedded at or near the line of greatest pressure. If this pressure is from the inside of dock, the beams have sufficient bearing against piers $A^2$. If the pressure is reversed, the tie-rods $D^2$ hold the beams in position.

At the points where the gates are to be located a series of metal sill-plates $E^2$ are embedded in the concrete at bottom and sides, placed about six feet apart and bolted to the concrete by bolts or anchors $K^2$. These sill-plates are adapted to support the keel of the floating caisson or gate when sunk in position and are wider on the bottom to distribute the load over as large an area of concrete as required. To the inner ends of the sill-plates are bolted metal boxes $F^2$, stiffened by flanges bolted to side plates and filled with concrete, forming the sill, against which the caisson presses when the water is removed from the dock, and in order to form a perfectly water-tight joint a rubber packing or gasket $I^2$ is clamped against the face of the boxes by covering-plates $G^2 H^2$, bolted to the boxes $F^2$ aforesaid. The packing or gasket preferably has side flanges $i^2$, which lie beneath the covering-plates, as shown.

The great advantage of constructing the table end as described is that, while only about one-third the cost of stone-work, all the advantages of stone construction are secured, as no wood-work of any kind is left exposed to the action of the sea and marine life. A dry-dock constructed as herein described is as permanent as a stone structure, the only parts requiring renewal being the timber flooring and altars, which can be renewed and repaired at a comparatively small cost.

The peculiar arrangement of the concrete filling and underlying timbering at the sides of the dock with the overlying altar-timbers makes a structure which is practically indestructible, save for the wear upon the altars, and this is easily and quickly repaired. The tendency of the concrete to slide downward is effectually counteracted and its continuity preserved.

It is obvious that the piling beneath the bottom may be omitted where the soil in which the dock is built has sufficient stability, and hence I do not wish to be limited in this respect.

Having thus described my invention, what I claim as new is—

1. In a dock such as herein described, the combination, with the structural timber-work, to which the water has uninterrupted access by saturation through the soil, of the overlying concrete filling, forming the water-tight dock-walls and protecting the structural timber-work from the air, substantially as described.

2. In a dock such as herein described, the combination, with the structural timber-work and the wearing timber-work, of the concrete filling or bed between said structural and wearing timber-work, substantially as described.

3. In a dock, the combination, with the concrete filling or bed, of the planking or timber-work beneath said concrete filling or bed, whereby pressure is distributed over a large area, substantially as described.

4. In a dock, the combination, with the inclined timber having horizontally-arranged ridges and depressions therein, of the concrete filling overlying said timbering and the altars supported by said concrete, substantially as described.

5. In a dock, the combination, with the inclined timbering formed of alternating thick and thin planks, of the concrete filling overlying said timbering and the altars supported thereon, substantially as described.

6. In a dock, the combination, with the inclined walls, of the altars formed of rectangular timbers independently supported on said inclined wall, whereby the shrinkage is confined to each individual timber, thus preserving the original position of the altars, substantially as described.

7. In a dock, the combination, with the inclined concrete side wall, of the altars formed of rectangular timbers partially embedded in the concrete and each with its forward edge overlapping the rear of the next lower altar, substantially as described.

8. In a dock, the combination, with the concrete filling or bed and timber-work, of the headed bolts embedded in the concrete and connected with the timber-work to hold the same in position, substantially as described.

9. In a dock, the combination, with the relatively-thin walls forming the table ends and the metal beams arranged longitudinally in said walls, of the thick concrete piers joining said walls on the outside and the tie-rods embedded in said piers and connected to the beams in the wall, substantially as described.

10. The combination, with the dock, of the metal sill-plates embedded in the concrete at the gates, with their surfaces above the level of the concrete, and the caisson or gate adapted to rest thereon, substantially as described.

11. The combination, with the dock, of the metal sill-plates embedded in the concrete at the gates and the boxes bolted thereto and forming the sill against which the caisson bears, substantially as described.

12. The combination, with a dock having the metal sill-plates embedded at the gates and the boxes bolted thereto to form a sill against which the caisson rests, of the rubber gasket and the plates on the boxes for holding said gasket in place, substantially as described.

OEHLMANN VON NERTA.

Witnesses:
THOMAS DURANT,
S. BRASHEARS.